United States Patent
Rushanan

(10) Patent No.: US 7,511,637 B2
(45) Date of Patent: Mar. 31, 2009

(54) SPREADING CODE DERIVED FROM WEIL SEQUENCES

(75) Inventor: Joseph J. Rushanan, Bedford, MA (US)

(73) Assignee: The Mitre Corporation, McLean, VA (US)

( * ) Notice: Subject to any disclaimer, the term of this patent is extended or adjusted under 35 U.S.C. 154(b) by 0 days.

(21) Appl. No.: 12/000,991

(22) Filed: Dec. 19, 2007

(65) Prior Publication Data

US 2008/0219327 A1 Sep. 11, 2008

Related U.S. Application Data

(60) Provisional application No. 60/901,658, filed on Feb. 16, 2007.

(51) Int. Cl.
   *H03M 7/00* (2006.01)
(52) U.S. Cl. .................. 341/50; 375/139; 375/140; 708/422; 708/492
(58) Field of Classification Search ............ 341/50; 375/130, 132, 138–140; 708/422–426, 492
   See application file for complete search history.

(56) References Cited

U.S. PATENT DOCUMENTS 5,953,327 A * 9/1999 Cox ............... 375/E1.002
6,181,729 B1 * 1/2001 O'Farrell ............ 375/130
2004/0002364 A1 * 1/2004 Trikkonen et al. ....... 455/562.1

OTHER PUBLICATIONS

Bomer L. et al., Perfect Three-Level and Three-Phase Sequences and Arrays, IEEE Transactions on Communications, vol. 42, No. 234, Feb.-Apr. 1994, pp. 767-772.*
No J.S. et al., New Construction for Families of Binary Sequences with Optimal Correlation Properties, IEEE Transactions on Information Theory, vol. 43, No. 5, pp. 1596-1602, Sep. 1997.*
Helleseth et al., Double Circulant Quadratic Residue Codes, IEEE Transactions on Information Theory, vol. 50 No. 9, Sep. 2004, pp. 2154-2155.*
Sun et al., A New Prime-Phase Sequence Family with Low Correlation and Large Size. Third International Workshop on Signal Design and Its Applications in Communications, IWASDA 2007, Sep. 2007, Inspec Accession No. 9782131, ISBN 978-1-4244-1074-3, pp. 79-83.*
ARINC, Navstar GPS Space Segment/User Segment L1C Interfaces, IS-GPS-800, ARINC Engineering Services, LLC, El Segundo, California, Apr. 19, 2006.
J.W. Betz et al., "Description of the L1C Signal," ION-GNSS-2006, Institute of Navigation, Sep. 2006, pp. 2080-2091.

(Continued)

*Primary Examiner*—Howard Williams
(74) *Attorney, Agent, or Firm*—Sterne, Kessler, Goldstein & Fox, PLLC.

(57) ABSTRACT

Methods and systems relating to Weil-based spreading codes are described herein. In an embodiment, a method includes generating a set of Weil sequences, adapting a plurality of sequences of the set of Weil sequences to form a first plurality of codes, and selecting a second plurality of codes from the first plurality of codes. A code of the first plurality of codes is selected based at least on a correlation associated with the code. Each code of the first plurality of codes has a predetermined length.

25 Claims, 7 Drawing Sheets

OTHER PUBLICATIONS

J.W. Betz, "Binary Offset Carrier Modulations for RadionNavigation," Navigation: Journal of the Institute of Navigation, vol. 48, No. 4, Winter 2001-2002, pp. 227-246.

L.R. Welch, "Lower Bounds on the Maximum Cross Correlation of Signals," IEEE Transactions on Information Theory, IT-20 (1974) pp. 397-399.

G. Gong, "New Designs for Signal Sets With Low Cross Correlation, Balance Property, and Large Linear Span: GF(p) Case," IEEE Transactions on Information Theory, vol. 48, No. 11, Nov. 2002, pp. 2847-2867.

K.G. Paterson, "Binary Sequence Sets with Favorable Correlations from Difference Sets and MDS Codes," IEEE Transactions on Information Theory, vol. 44 (1998), No. 1, pp. 172-180.

J.J. Rushanan, "Weil Sequences: A Family of Binary Sequences with Good Correlation Properties," IEEE International Symposium on Information Theory, Seattle, Washington, Jul. 9-14, 2006, pp. 1648-1652.

A.R. Pratt et al., "Concatenated Truncated Codes Structure Performance and Mechanisation," ION NTM 2005, Jan. 2005, Institute of Navigation, pp. 741-753.

Z. Guohua et al., "Pseudonoise Codes Constructed by Legendre Sequence," Electronics Letters, vol. 38, No. 8, Apr. 2001, pp. 376-377.

G. Hein et al., "MBOC: The New Optimized Spreading Modulation Recommended for Galileo L1 OS and GPS L1C," Proceedings of the IEEE/ION Position, Location, and Navigation Symposium, Coronado, California, Apr. 2006, pp. 883-892.

"The Spreading and Overlay Codes for the L1C Signal," Joseph J. Rushanan, Proceedings of the Institute of Navigation 2007 National Technical Meeting, Jan. 22-24, 2007, San Diego, CA.

* cited by examiner

SPREADING CODE DERIVED FROM WEIL SEQUENCES

CROSS REFERENCE TO RELATED APPLICATIONS

This application claims the benefit of U.S. Provisional Appl. No. 60/901,658, filed Feb. 16, 2007, which is incorporated by reference herein in its entirety.

STATEMENT REGARDING FEDERALLY-SPONSORED RESEARCH AND DEVELOPMENT

The U.S. government has a paid-up license in this invention and the right in limited circumstances to require the patent owner to license others on reasonable terms as provided for by the terms of Contract No. FA8721-06-C-0001 awarded by the United States Air Force.

BACKGROUND OF THE INVENTION

1. Field of the Invention

The present invention relates generally to telecommunications, and more particularly to spread spectrum communications systems.

2. Background Art

Spread spectrum communications offer a number of advantages over other types of communications. In operation, spread spectrum signals are often designed to have advantageous correlation properties. Many different methods have been developed to improve the performance of spread spectrum signals.

Spreading codes have been developed which, when modulated with a baseband signal, often give the resulting modulated signal advantageous correlation properties. These correlation properties reduce the likelihood that the resulting modulated signal will interfere with other signals or be interfered with by other signals. Moreover, improved correlation properties also increase the likelihood that a signal will be properly received at an intended receiver. Although many different types of spreading code families have been developed, many of those families offer little freedom in terms of the length of the spreading code and the size of the family of spreading codes. Thus, what is needed is methods and systems that provide flexible spreading codes which, when modulated with a baseband signal, improve correlation properties of the resulting modulated signal.

BRIEF SUMMARY OF THE INVENTION

The invention is directed to methods, systems, and computer program products for providing spreading codes based on Weil sequences.

In an embodiment, a method includes generating a set of Weil sequences, adapting a plurality of sequences of the set of Weil sequences to form a first plurality of codes, and selecting a second plurality of codes from the first plurality of codes. A code of the first plurality of codes is selected based at least on a correlation associated with the code. Each code of the first plurality of codes has a predetermined length.

In another embodiment, a method of generating a signal includes providing a sequence of symbols and modulating a sequence of symbols with a Weil-based spreading code. The Weil-based spreading code includes at least a portion of a Weil sequence.

In yet another embodiment, a system for generating a signal includes a sequence provider configured to provide a sequence of symbols and a modulator coupled to the sequence provider configured to modulate the sequence of symbols with a spreading code. The spreading code is a Weil-based spreading code. The Weil-based spreading code includes at least a portion of a Weil sequence.

Further features and advantages of the present invention, as well as the structure and operation of various embodiments thereof, are described in detail below with reference to the accompanying drawings. It is noted that the invention is not limited to the specific embodiments described herein. Such embodiments are presented herein for illustrative purposes only. Additional embodiments will be apparent to persons skilled in the relevant art(s) based on the teachings contained herein.

BRIEF DESCRIPTION OF THE DRAWINGS/FIGURES

The accompanying drawings, which are incorporated herein and form a part of the specification, illustrate the present invention and, together with the description, further serve to explain the principles of the invention and to enable a person skilled in the pertinent art to make and use the invention.

Figure 1:
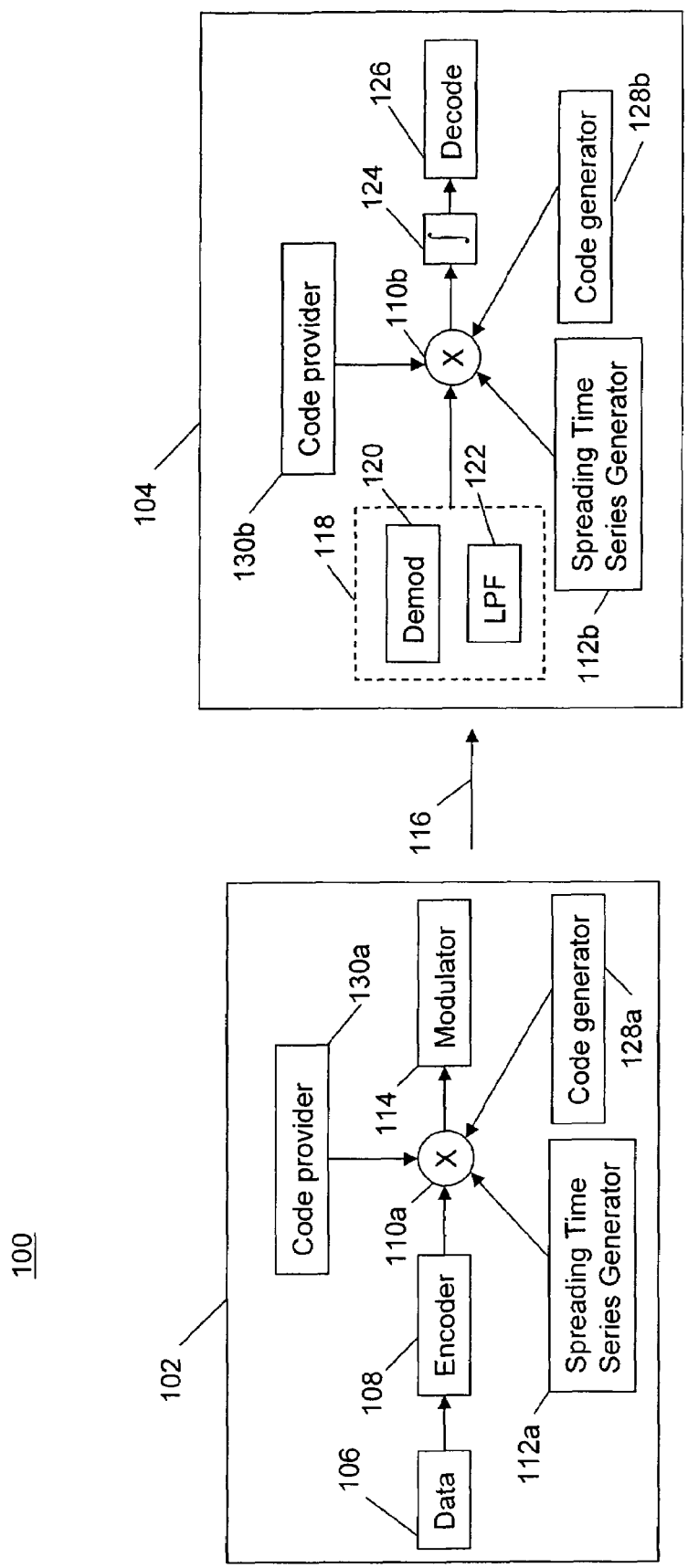
FIG. 1 illustrates a spread spectrum communication environment according to an embodiment of the invention.

The features and advantages of the present invention will become more apparent from the detailed description set forth below when taken in conjunction with the drawings. In the drawings, like reference numbers generally indicate identical, functionally similar, and/or structurally similar elements. Generally, the drawing in which an element first appears is indicated by the leftmost digit(s) in the corresponding reference number.

DETAILED DESCRIPTION OF EMBODIMENT(S)

Spread Spectrum Communications

A block diagram of an exemplary spread spectrum communication system 100 is shown in FIG. 1. Communication system 100 may be a wireless communication system such as but not limited to a Bluetooth communication system, a satellite communication system, a wireless local area network (WLAN), etc. Communication system 100 includes a transmitter 102 and a receiver 104. In alternate systems, transceivers, i.e., devices that include components configured to transmit and receive communications, may be used.

Transmitter 102 includes a data device 106, an encoder 108, a multiplier 110a, a spreading time series generator 112a, a pseudo-random code generator 128a, a spreading code provider 130a, and a modulator 114. Transmitter 102 generates a signal 116, which is received by receiver 104. In the embodiment where receiver 104 is a transceiver, receiver 104 may also transmit signals to transmitter 102. Receiver 104 includes a detector 118, a multiplier 110b, a spreading time series generator 112b, a pseudo-random code generator 128b, an integrator 124, a decoder 126, and a spreading code provider 130b.

Data device 106 may be a computer processing unit, microcontroller, or other device that generates a baseband signal. The baseband signal may, for instance, be information that is to be transmitted to receiver 104. The baseband signal may include a plurality of symbols. In such an embodiment, a symbol may be a plurality of bits that have a specific meaning to an intended receiver. The baseband signal is communicated to encoder 108. Encoder 108 encodes the information contained in the baseband signal according to an encoding algorithm, such as but not limited to non-return to zero coding, an error correcting coding, or other coding as would be apparent to persons skilled in the relevant art(s). Encoder 108 outputs the encoded data to multiplier 110a. In an embodiment where transmitter 102 is configured to transmit a pilot component, data device 106 and encoder 108 may be replaced by an overlay code generator. Thus, the overlay codes generated by the overlay code generator would represent the informational content contained in signal 116. In signals that contain both pilot and data components, the pilot and data components may be multiplexed together using a time multiplexing or phase multiplexing technique, combined with other signal components using a linear combining technique or a non linear technique such as majority voting, or an interplexing technique, as would be appreciated by those skilled in the relevant art(s).

In contrast to a data component, a pilot component does not typically contain information, but rather is often used in signal tracking by a receiver. Signal tracking refers to the estimation of the timing features of the received signal so that the receiver can successfully despread the incoming signal, demodulate data, and generate pseudorange and carrier-phase measurements. Each of these two components may be modulated separately before the entire signal is modulated to a carrier frequency that eventually carries the signal to the intended destination. A Global Navigation Satellite System (GNSS) signal may also include other components as would be apparent to those skilled in the relevant art(s). Moreover, as would also be appreciated by those skilled in the relevant art(s), a GNSS signal may include more than one data component and/or more than one pilot component. In an embodiment, a GNSS signal may also include multiple pilot and/or data components as well as other components.

Multiplier 110a multiplies the encoded data signal with a spreading time series generated by spreading time series generator 112a. The spreading time series may be configured to increase a total bandwidth used by the encoded data signal. In an embodiment, the spreading time series may be expressed as:

$$s(t) = \sum_{k=-\infty}^{\infty} g_k(t - kT_c) \quad \text{Equation 1}$$

where s(t) is the spreading time series,
$\{g_k(t-kT_c)\}$ are a series spreading symbols, and
$T_c$ is a period of a spreading symbol.
Spreading time series s(t) includes a plurality of chips. Typical spreading symbols are non-zero only over the interval $[0, T_c)$. Accordingly, those skilled in the art would recognize that the sum of Equation 1 may reduce to only one non-zero term at a given time t. Spreading symbols $\{g_k(t)\}$ may be a variety of different types of symbols. For example, the binary phase shift keyed (BPSK) spreading symbol has a constant value for all chips.

In other embodiments, spreading symbols of a spreading time series may include binary offset carrier (BOC) spreading symbols. BOC spreading symbols consist of one or more periods of a rectangular wave over the duration of a chip. Different types of BOC symbols are typically abbreviated as BOC (n,m), were n corresponds to a rate of a rectangular wave and m corresponds to a rate of a pseudo-random code applied to the spreading symbol. In an embodiment, n and m are coefficients of a 1.023 MHz frequency. For example, a BOC (6,1) spreading symbol corresponds to a rectangular wave frequency of 6.138 MHz with an applied pseudo-random code rate of 1.023 MHz. In a further embodiment in which the width of a chip corresponds to a frequency of 1.023 MHz (about 1 µs), an integral number of periods of the rectangular wave are included in a single chip. Moreover, in a case where a BOC(n,1) spreading symbol is used, a single symbol of the pseudo-random code is applied to the entire chip.

For example, a BOC(1,1) spreading symbol may be expressed as:

$$g(t) = \begin{cases} \text{sgn}[\sin(2\pi t/T_c)] & 0 \le t \le T_c \\ 0 & \end{cases} \quad \text{Equation 2}$$

A BOC(6,1) spreading symbol may be expressed as:

$$g(t) = \begin{cases} \text{sgn}[\sin(12\pi t/T_c)] & 0 \le t \le T_c \\ 0 & \end{cases} \quad \text{Equation 3}$$

Thus, a BOC(1,1) spreading symbol has one period of a rectangular wave per chip. A BOC(6,1) spreading symbol has six periods of a rectangular wave per chip.

In an embodiment, a spreading time series may include more than one type of spreading symbol. For example, a spreading time series may include both BOC(1,1) and BOC (6,1) spreading symbols in a time multiplexed binary offset carrier (TMBOC) spreading time series. For more information on an embodiment of TMBOC refer to U.S. Non-Provisional application Ser. No. 11/785,571, entitled "Time-Multiplexed Binary Offset Carrier Signaling And Processing," filed Apr. 18, 2007, which is incorporated herein by reference in its entirety.

The product of the spreading time series and the encoded data signal is also multiplied with a pseudo-random code generated by pseudo-random code generator 128a. The pseudo-random code may be a periodic sequence generated by any of a multitude of pseudo-random algorithms, as would be appreciated by persons skilled in the relevant art(s), and may be configured to be interpreted as noise by any unintended recipient of signal 116.

Multiplier 110a also multiplies the encoded data signal with a spreading code provided by spreading code provider 130a. A spreading code is a periodic sequence a that includes N elements. Spreading codes may be derived from mathematical sequences. Elements of spreading code a are often binary and exhibit good correlation properties. In an embodiment, each element of spreading code a has the same period, $T_c$, of spreading time series s(t). In such an embodiment a single spreading code element is applied to each chip.

Multiplier 110a then outputs the product of the spreading time series, the encoded data signal, the spreading code, and the pseudo-random code. Modulator 114 modulates the product signal. In an embodiment, modulator 114 may modulate the product signal according to a commonly known modulation technique, such as but not limited to phase shift keying, quadrature amplitude modulation, etc. In an embodiment where the product is binary, binary versions of the aforementioned techniques may be used. In an embodiment, modulator 114 may output a modulated signal to an antenna (not shown in FIG. 1) that generates signal 116. The product may also be modulated according to a time multiplexing or phase multiplexing technique, combined with other signal components using a linear combining technique or a non linear technique such as majority voting, or an interplexing technique, as would be appreciated by those skilled in the relevant art(s).

Signal 116 is received at receiver 104. Received signal 116 is applied to detector 118. In an embodiment, detector 118 is a coherent detector and includes a demodulator 120 and a low pass filter (LPF) 122. Detector 118 demodulates received signal 116 and outputs a demodulated signal. The demodulated signal is then multiplied with a second pseudo-random code generated by pseudo-random code generator 128b, a second spreading time series generated by second spreading time series generator 112b, and a second spreading code provided by spreading code provider 130b by multiplier 110b. Multiplier 110b is substantially similar to multiplier 110a in transmitter 102. Spreading time series generator 112b, pseudo-random code generator 128b, and spreading code provider 130b are substantially similar to spreading time series generator 112a, pseudo-random code generator 128a, and spreading code provider 130a in transmitter 102. In an embodiment, spreading code provider 130b provides a spreading code that is substantially identical to the spreading code provided by spreading code provider 130a. Additionally or alternatively, spreading time series generator 112b may generate a spreading time series that is substantially identical to the spreading time series generated by spreading time series generator 112a and/or pseudo-random code generator 128b may generate a pseudo-random code that is substantially identical to the pseudo-random code generated by pseudo-random code generator 128a. In a further embodiment, spreading time series generator 112b, pseudo-random code generator 128b, and spreading code provider 130b are synchronized with spreading time series generator 112a, pseudo-random code generator 128a, and spreading code provider 130a, respectively.

Multiplying the demodulated signal with the second spreading time series and the second spreading code at multiplier 110b effectively despreads the received signal (i.e., reverses the effects of the spreading time series and the spreading code). The product of the demodulated signal, the second pseudo-random code, the second spreading time series, and the second spreading code is then applied to integrator 124 that integrates the product signal over a bit period and outputs the result to decoder 126. Decoder 126 attempts to reproduce the original data signal based on the result provided by integrator 124. Alternatively, a correlation receiver or matched filter receiver may also be used to despread and decode the demodulated signal.

Properties of Global Navigation Satellite Signals

As described above, a GNSS signal often contains one or more data components and one or more pilot components. In an embodiment, the total power of the GNSS is evenly split between the data and pilot component(s). However, in alternate embodiments, pilot or data component(s) may be weighed unevenly to improve performance at the receiver. In a further embodiment, a GNSS signal may have 75% of its total signal power allocated to the pilot component(s) and 25% of its total signal power allocated to its data component(s).

In an L1C signal, a baseband signal is modulated with a spreading code, spreading time series, and a pseudo-random code to produce a modulated baseband signal. In an embodiment, the frequency of the baseband signal is 100 Hz, i.e., 100 symbols per second. In a further embodiment, the frequency of the spreading time series, i.e., the chipping rate, is 1.023 MHz. Therefore, as would be appreciated by those skilled in the relevant art(s), there are 10230 chips per baseband symbol. Each chip is modulated with a spreading symbol of the spreading time series, e.g., a BOC(1,1) or a BOC(6,1) spreading symbol, and an element of a spreading code. Thus, as would be apparent to those skilled in the relevant art(s), in the L1C signal embodiment, the desired length for the corresponding spreading code is 10230. A spreading code that has a length of 10230 may be applied in its entirety to each symbol of the baseband signal.

Figure 2:
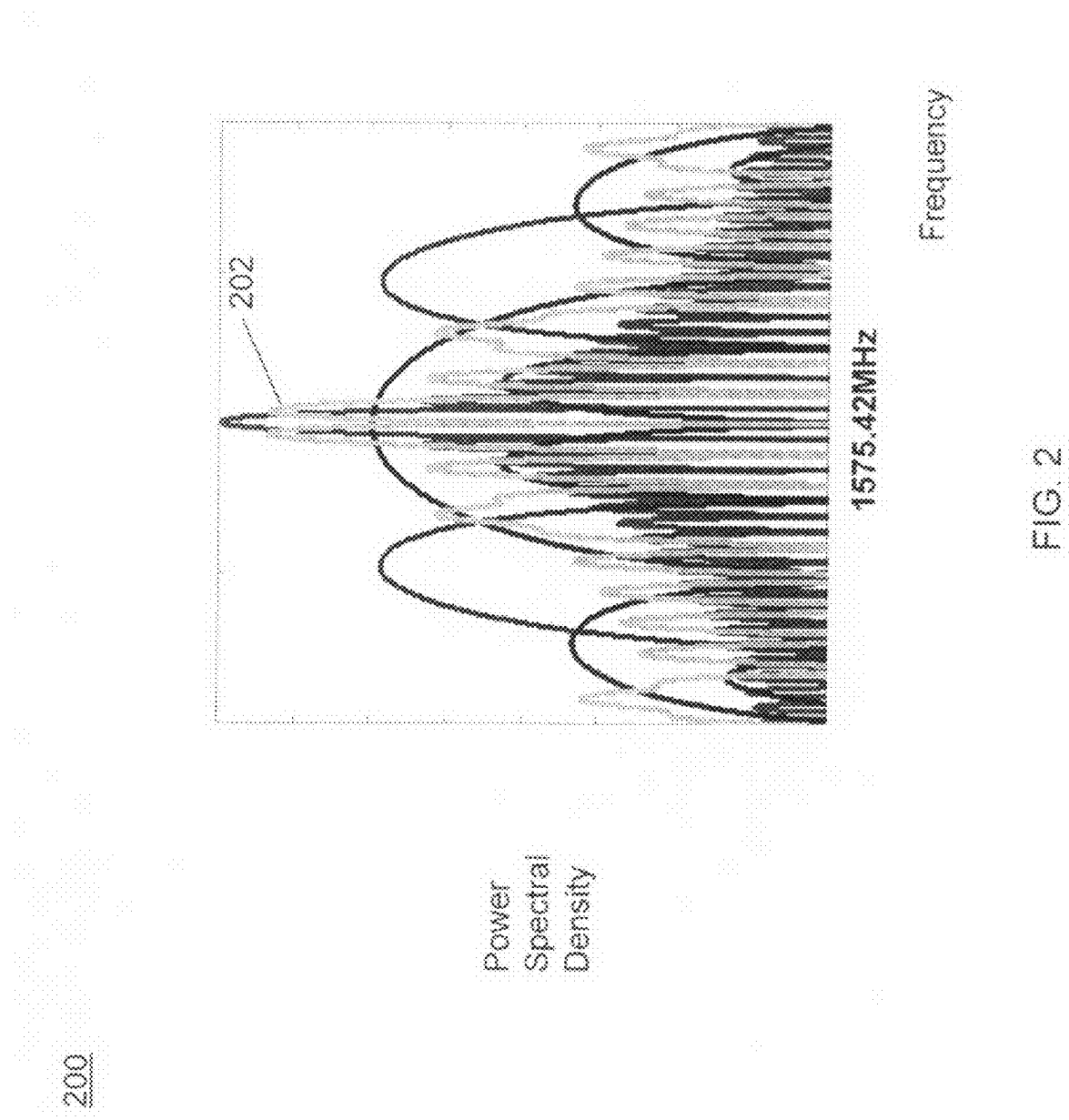
FIG. 2 illustrates power spectral densities of several signals according to an embodiment of the present invention.

Once the baseband signal is modulated, the resulting modulated signal is then modulated to a carrier frequency (e.g., through one of the techniques described above with reference to FIG. 1). In an embodiment, the center of the carrier frequency is 1575.42 MHz. FIG. 2 illustrates power spectral densities of several signals with center carrier frequencies of 1575.42 MHz. For example, waveform 202 illustrates the power spectral density of an L1C GNSS signal. It is noted that GNSS is discussed herein for purposes of illustration and not limitation. Embodiments of the invention are applicable to applications other than GNSS applications.

Sequences

As noted above, spreading codes used in spread spectrum communications are often derived from mathematical sequences. Sequences are a collection of symbols arranged in a sequential form. In an embodiment, the sequences are binary, e.g., their symbols only take on values ±1. A sequence may have an associated length. The length of a sequence is defined as the number of symbols contained within the sequence.

In an embodiment, an index, i, may be used to index a sequence. In a further embodiment, the value of a symbol may depend on the index.

Sequences may be configured to have advantageous properties. In an embodiment, sequences are used as the basis, either alone or in combination with other sequences, for spreading codes that have advantageous correlation properties. The autocorrelation for a sequence a with length N may be defined as:

$$\text{auto}(a; \tau) = \sum_{i=0}^{N-1} a_i a_{i+\tau}, \quad \text{Equation 4}$$

where i indexes sequence a, and $\tau$ is an integer.

The cross-correlation of sequence a and another sequence b, also of length N, may be defined as:

$$\text{cross}(a, b; \tau) = \sum_{i=0}^{N-1} a_i b_{i+\tau}, \qquad \text{Equation 5}$$

where i and $\tau$ are defined as before.

In an embodiment, only periodic correlations are considered. In such an embodiment, all subscript arithmetic, e.g., $i+\tau$, may be modulo N. An autocorrelation may be termed an autocorrelation sidelobe, when $\tau$ is not congruent to 0 modulo N, i.e., $\tau$ is not a multiple of N. A cross-correlation may be termed a cross-correlation sidelobe for any value of $\tau$.

Families of sequences are defined as a collection of two or more sequences. Correlation properties may also be defined for families of sequences. A family is often configured such that each sequence of the family has good autocorrelation properties and has good cross-correlation properties with other sequences in the family. In describing a family with M members, then, each sequence has N−1 autocorrelation sidelobes and N cross-correlation sidelobes with each of the M−1 other members in the family. A maximum autocorrelation sidelobe for a family is defined as the maximum of all the individual autocorrelation sidelobes associated with each member of the family. Similarly, a maximum cross-correlation sidelobe is defined as the maximum of all the pair wise cross-correlation sidelobes associated with each member of a family. The Welch bound provides a lower bound on the maximum sidelobe (both autocorrelation and cross-correlation) for a family with M members as:

$$\sqrt{N}\sqrt{\frac{MN-N}{MN-1}}$$

where N is defined as the length of each sequence of the family, as described above. As would be appreciated by those skilled in the relevant art(s), as the maximum autocorrelation and cross-correlation sidelobes of a family approaches the Welch bound, performance of the family typically improves.

For a list of exemplary sequence families and associated properties see *The Spreading and Overlay Codes for the L1C Signal* by Joseph J. Rushanan, which is incorporated by reference herein in its entirety.

Weil Sequences

Weil sequences are prime length sequences derived from Legendre sequences. Weil and Legendre sequences will be referred herein as having a length, p, where p is any prime number. A symbol of a Legendre sequence is defined as:

$$\left(\frac{x}{p}\right) = \begin{cases} 0 & p \text{ divides } x \\ 1 & x \text{ is a square}(\text{mod } p) \\ -1 & x \text{ is not a square}(\text{mod } p) \end{cases},$$

where x is an integer.

Thus, a Legendre symbol is at least partially based on which integer values are square (mod p). Integer x is defined to be square (mod p) if there exists an integer, y, such that $x \equiv y^2 \pmod{p}$. For example, 2 is square(mod 7), (i.e., the quantity $$\frac{2-y^2}{7} = \text{an integer,}$$

when y=4). A Legendre sequence, then, is defined as:

$$\text{Leg}_p(0) = -1 \text{ and} \qquad \text{Equation 6}$$

$$\text{Leg}_p(i) = \left(\frac{i}{p}\right), \qquad \text{Equation 7}$$

where i is an index, as described above.

The autocorrelation for a Legendre sequence for $\tau$ not divisible by p is:

$$\text{auto}(\text{Leg}_p; \tau) = \begin{cases} +1 \text{ or } -3, & p \equiv 1(\text{mod } 4), \\ -1, & p \equiv 3(\text{mod } 4). \end{cases} \qquad \text{Equation 8}$$

A Weil sequence is defined as:

$$\text{Weil}_p^k(i) = \text{Leg}_p(i)\text{Leg}_p(i+k), \qquad \text{Equation 9}$$

where k is a family index that may range from 1 to (p−1)/2.

The balance of a sequence is the sum of the symbols of the sequence for a single period. It can be shown that Weil sequences have a balance of +1, −3, or −1, based on the value of p.

As shown in Equation 9, each symbol of a Weil sequence, $\text{Weil}_p^k(i)$, depends on the index i and the chosen values for p and k, i.e., the length and the family index, respectively. Thus, to determine an individual symbol of a Weil sequence, the values for i, k, and p are specified. A collection of symbols, e.g., a sequence, is defined when k and p are specified and is indexed by i. A collection of sequences, e.g., a family of sequences, is defined when p is defined and may be indexed by k while each individual sequence remains indexed by i, as noted above. For a given prime length p, k is allowed to span the range from 1 to (p−1)/2. Therefore, in such an embodiment, each family has (p−1)/2 sequences.

For example, a family of Weil sequences with given prime length of seven has three sequences that each have a length of seven (e.g., (7−1)/2=3). Such a family is indexed by k that may range from 1 to 3. Each sequence of the family is indexed by i, which may range from 1 to 7.

In another embodiment, a Legendre sequence of length p can be added to a family of Weil sequences that includes sequences of length p to create a family of (p+1)/2 sequences.

Families of sequences are often configured to have advantageous correlation (e.g., autocorrelation or cross-correlation) properties. An upper bound on the maximum correlation sidelobe for a Weil sequence may be computed to be $5+2\sqrt{p}$.

As described above, a family of Weil sequences is defined by the chosen prime length p. As would be appreciated by those skilled in the relevant art(s), families of Weil sequences may be defined in different ways. In alternate embodiments, for example, a family of Weil sequences may be defined by a chosen family index, k.

Spreading Codes and Spreading Code Families

Mathematical sequences are often employed in spread spectrum communications. Specifically, sequences are often used to form spreading codes. In adapting a sequence into a spreading code, the length of the sequence must be adjusted based on the communication environment. For example, in the case of the L1C signal that has 10230 chips per symbol, the sequence would have to be modified, e.g., by inserting or removing symbols, so its length is equal to 10230. In such a manner, families of sequences may be adapted to form families spreading codes.

In adapting sequences to form spreading codes, the advantageous correlation properties of the sequence should be maintained or enhanced. In Equations 4 and 5, described above, the correlation properties of a sequence are considered without regard for the symbols that the spreading code will be modulated with. Specifically, the correlation measures described above (i.e., autocorrelation and cross-correlation) do not account for transitions at symbol boundaries. In the case that there is no transition at the symbol boundary, i.e., the even case, the correlations defined in Equations 4 and 5 hold. However, in the odd case in which there is a transition across a bit boundary defined by $\tau$, an autocorrelation for a spreading code a (i.e., the spreading code derived from sequence a) may be defined as:

$$oddauto(a, \tau) = \sum_{i=0}^{N-\tau-1} a_i a_{i+\tau} - \sum_{i=N-\tau}^{N-1} a_i a_{i+\tau}.$$

Equation 10

Similarly, an odd cross-correlation between spreading code a and another spreading code b may be defined as:

$$oddcross(a, b, \tau) = \sum_{i=0}^{N-\tau-1} a_i b_{i+\tau} - \sum_{i=N-\tau}^{N-1} a_i b_{i+\tau}.$$

Equation 11

In an embodiment, in choosing a spreading code, both the even and odd correlation properties of the spreading code should be considered.

Weil-Based Spreading Codes

The description herein refers to Weil-based spreading codes and their applications. As described above, spreading codes include a series of values, e.g., binary values, with which a baseband or other signal is modulated. In an embodiment, a spreading code is configured to improve the correlation properties of the signal.

Figure 3:
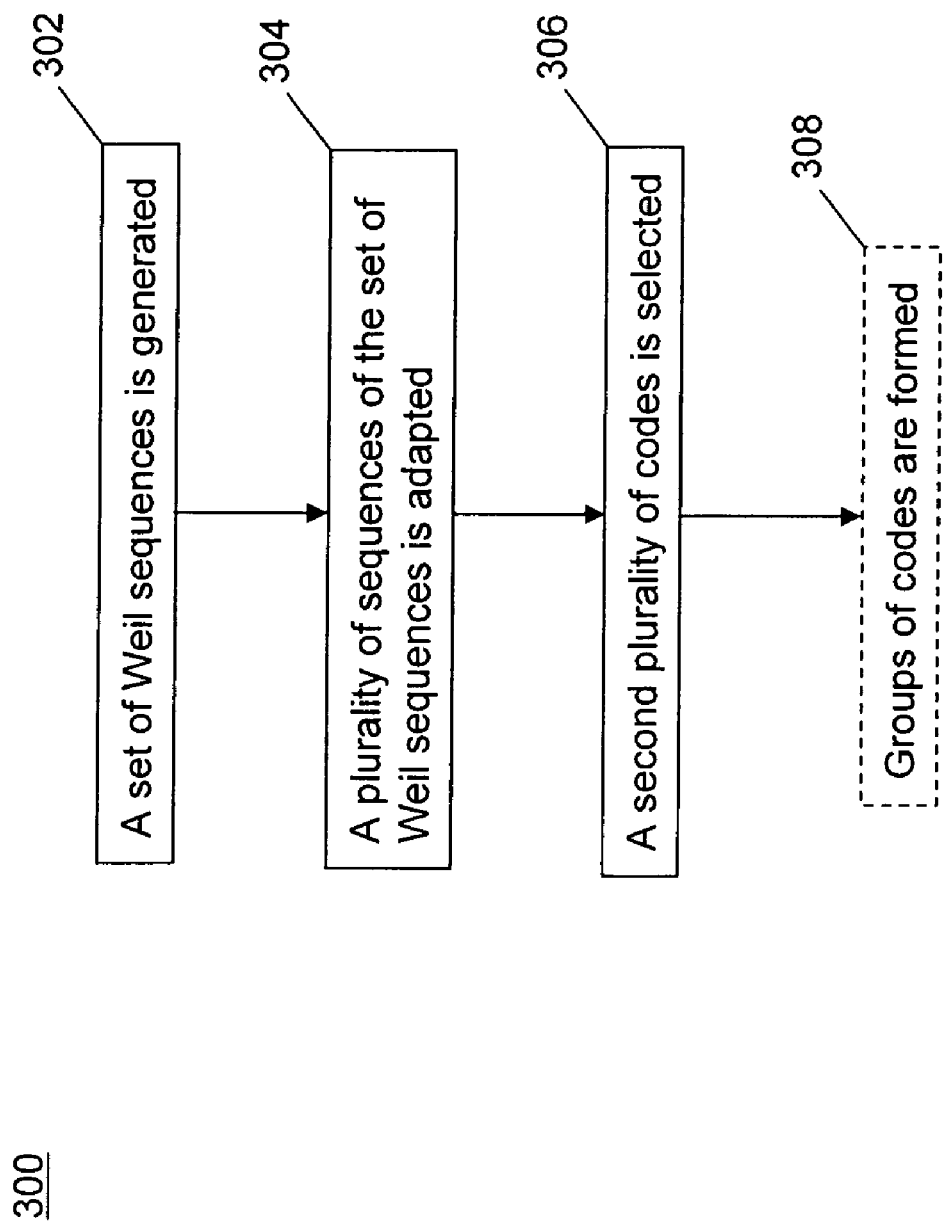
FIG. 3 illustrates a process flowchart according to an embodiment of the present invention.

The operation of an embodiment of the present invention is represented by flowchart 300 illustrated in FIG. 3. Other structural and operational embodiments will be apparent to persons skilled in the relevant art(s) based on the following discussion. The steps shown in FIG. 3 do not necessarily have to occur in the order shown. Flowchart 300 shall now be described.

Flowchart 300 begins with step 302. In step 302, a set of Weil sequences is generated. In an embodiment, the set of Weil sequences is generated as a family of Weil sequences. For example, a family of Weil sequences may be generated through the use of Equation 9, as described above. In such an embodiment, a family may be generated by setting the length, p, of each sequence in the set.

For example and without limitation, the length of the each sequence in the family may be equal to 10223 or 10243. In the embodiment in which each sequence of the family of sequence has length 10223, the family index, k, may range from 1 to 5111 (e.g., (10223−1)÷2=5111). Therefore, in such an embodiment there are 5111 length-10223 sequences in such a family.

In an embodiment, a Weil sequence of a set of Weil sequences may be generated using a shift-and-multiply approach. For example, to obtain a Weil sequence for a given family index, k, a shift-and-multiply approach may be used. In such an embodiment a first Legendre sequence for the given k may be multiplied with a second Legendre sequence, where the second Legendre sequence is the first Legendre sequence shifted by k. For example, to generate a Weil sequence for a family index, i.e., k, of 3, a first Legendre sequence is generated for the family index of 3 and the previously defined length (e.g., 10223). A second Legendre sequence may be defined by shifting the first Legendre sequence to the left by 3 places. The first and the second Legendre sequences are then multiplied to determine the Weil sequence for a k of 3.

In another embodiment, powers of 2 modulo 10223 may be used to generate the nonzero squares modulo 10223. Therefore, an arithmetic shift register that is a multiply-by-2 and conditional subtract can be used to determine the locations of the +1 values in a Legendre sequence.

In step 304, a plurality of sequences of the set of Weil sequences is adapted to form a plurality of codes. For example, in the embodiment where each sequence has a length of 10223, a subset of the possible 5111 sequences may be adapted to form a plurality of codes. In an alternate embodiment, each of the 5111 possible sequences may be adapted to form 5111 codes.

In an embodiment, a sequence of the set of Weil sequences is adapted by inserting a pad code at a defined location. For example, an L1C signal may have 10230 chips per symbol of the baseband signal. As note above, in such an embodiment, the desired length of the spreading code may be 10230. Thus, in adapting a length-10223 sequence, seven elements may be added to reach the desired length of 10230. In a further embodiment, the pad code may be configured to give the resulting code a balance of zero. For example, pad code may be +1, −1, −1, +1, −1, +1, +1, e.g., for a Weil sequence that has balance equal to −1.

In the embodiment in which each of the Weil sequences has a length equal to 10223 and the predetermined length of each code is 10230, there are 10223 different locations to insert the seven-element pad. In such an embodiment, then, there are 5111 different Weil sequences and 10223 different insertion points, s, in each of the 5111 different Weil sequences where the pad code may be inserted. Therefore, adapting the set of Weil sequences leads to 52,249,753 possible codes that have a length equal to 10230 and are indexed by the family index, k, and the insertion point, s, for each seven-element pad code. The inventor has recognized that different pad codes often do not lead to substantially different properties of the resulting spreading codes. Thus, in choosing spreading codes, as is done in step 306, described below, different codes remain indexed by a family index, k, and the insertion point, s. In alternate embodiments, the number of possible codes can be increased by varying the values of the pad code. In such an embodiment, the resulting possible codes would be indexed by the pad code, as well as the family index, k, and the insertion point, s.

In another embodiment, portions of a pad code may be inserted at different points in a given sequence. For example, three elements of a seven element pad code may be inserted at a first defined location within a Weil sequence and four elements may be inserted at a second defined location within the Weil sequence.

In an alternate embodiment, a plurality of sequences of the set of Weil sequences may be adapted in other ways. For example, in the embodiment in which each of the sequences is has a length equal to 10243, adapting a sequence of such set of Weil sequences may include removing 13 elements from a plurality of sequences of the set of Weil sequences.

In step 306, a second plurality of codes is selected from the first plurality of spreading codes formed in step 304. In an embodiment a code is selected based on properties of the code. For example, codes may be selected based on their autocorrelation properties and their cross-correlation properties with other codes. Moreover, as described above, both even and odd correlations may be considered in making a selection.

In an embodiment, thresholds for the even and odd auto-correlations and cross-correlations sidelobes are set to select codes for the second plurality of codes. Codes that have correlations that satisfy these thresholds are selected. In a further embodiment, a code satisfies a correlation threshold by having a corresponding correlation that is less than the threshold.

The threshold may be determined by performance needs and the total number of codes needed. In an embodiment, L1C communications requires 420 codes. In such an embodiment, an even autocorrelation sidelobe threshold of −31 dB and an odd autocorrelation sidelobe threshold of −28 dB may be set. Furthermore, an even cross-correlation sidelobe threshold of −27.2 dB and an odd cross-correlation sidelobe threshold of −26.2 dB may be set. In the embodiment in which the codes are selected from a plurality of codes that are adapted length-10223 Weil sequences, these thresholds lead to 739 selected codes. Thus, of the 52,249,753 possible codes, 739 are selected.

Figure 4:
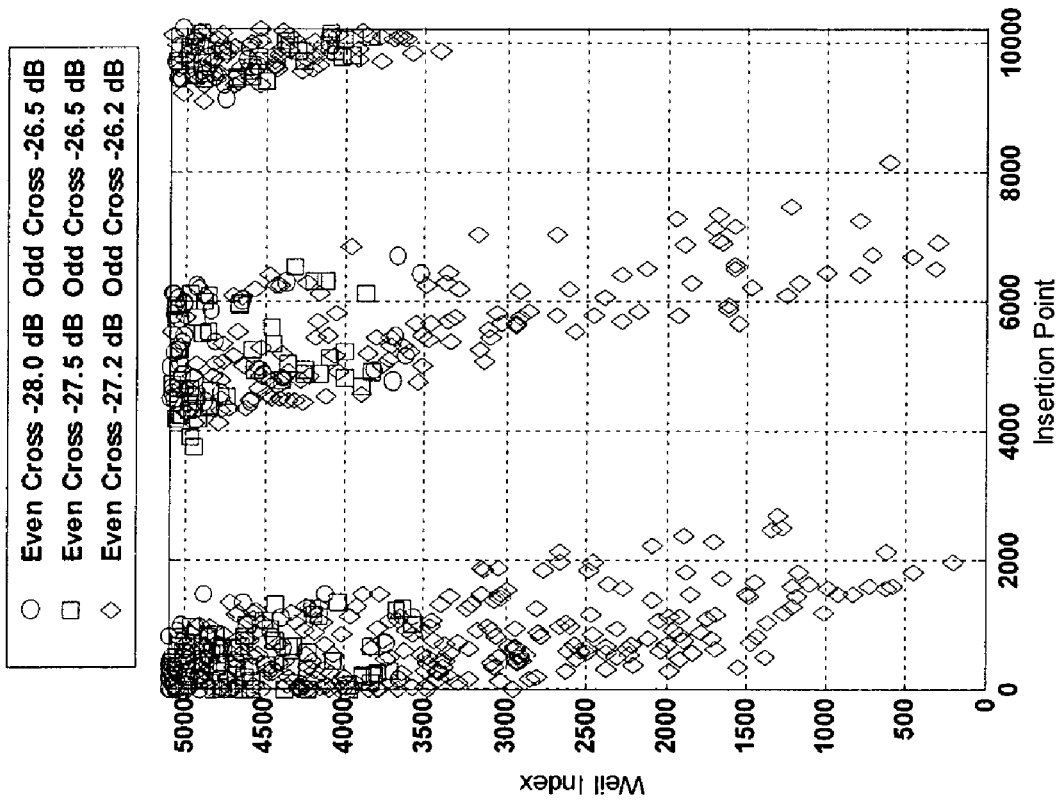
FIG. 4 illustrates a plot of the correlation properties of different Weil-based spreading codes according to an embodiment of the present invention.

Of the 739 codes obtained, various subsets may also be formed. For example, an even cross-correlation sidelobe threshold of −28 dB and an odd cross-correlation sidelobe threshold of −26.5 dB may be set to obtain 109 codes. Furthermore, an even cross-correlation sidelobe threshold of −27.5 dB and an odd cross-correlation sidelobe threshold of −26.5 dB may be set to obtain 259 codes, e.g., 109 obtained with the earlier threshold and 150 additional codes. As would be apparent to those skilled in the relevant art(s), as the threshold criteria are relaxed more codes fall into the selected group. FIG. 4 shows a plot 400 that illustrates spreading codes, based on length-10223 Weil sequences, which fall under different thresholds.

As would be appreciated by those skilled in the relevant art(s), implicit in the selection of the second plurality of Weil-based spreading codes is a sample-per-chip correlation calculation. The sample-per-chip may determine what type of spreading time series the selected spreading codes will be optimized for. For example, a one sample-per-chip correlation calculation is sufficient when considering BPSK or BOC (1,1) spreading symbols. Thus, the selection of the second plurality of spreading codes is optimized for BOC(1,1) spreading symbols, but may not be optimized for other spreading time series. For example, such a selection may not be optimized for a spreading time series that includes BOC (6,1) spreading symbols, such as a time multiplexed binary offset carrier (TMBOC) spreading time series. For more information on an embodiment of TMBOC refer to U.S. Non-Provisional application Ser. No. 11/785,571, entitled "Time-Multiplexed Binary Offset Carrier Signaling And Processing," filed Apr. 18, 2007, which is incorporated herein by reference in its entirety. For a TMBOC spreading time series, correlation calculations may be done using 12 samples-per-chip correlation calculation.

Thus, as described above, a second plurality of spreading codes may be selected from the first plurality of spreading codes based on correlation properties. A selection may be made by setting one or more thresholds corresponding to even or odd autocorrelation or cross-correlation sidelobes and selecting those codes that satisfy the thresholds. In determining whether a spreading code satisfies a threshold, its correlation properties must be calculated. In performing this calculation, a sample-per-chip assumption must be made. The sample-per-chip assumption will determine types of spreading time series that the selected spreading codes will be optimized for. Therefore, from the first plurality of spreading codes, multiple sets of spreading codes may be selected. A first set may be selected based on a single sample-per-chip assumption (e.g., for a spreading time series that includes BPSK or BOC(1,1) spreading symbols). A second set may be selected based on another sample-per-chip assumption, e.g., 12 samples-per-chip for a TMBOC spreading time series. As would be appreciated by those skilled in the relevant art(s), a spreading code that belongs to the first set may also be included in the second set.

The selection of 739 codes that have lengths equal to 10230 based on length-10223 Weil sequences is presented only as an example. As would be apparent to those skilled in the relevant art(s), selection may be based on other thresholds for even and odd autocorrelation and cross-correlation and/or based on other criteria without departing from the scope and the spirit of the present invention.

In optional step 308, groups of codes are formed from the second plurality of codes selected in step 306. For example, pairs of codes may be formed. In such a pair, a first code may be designated as a pilot spreading code and a second code may be designated as a data spreading code. In alternate embodiments, a group may include more than two codes. For example, in the embodiment in which there is more than one pilot and/or data component or the baseband signal includes components other than the pilot and data component(s), a group may include three or more codes.

In an embodiment, groups may be formed such that each code of the group has a relatively low cross-correlation with other codes of the group. For example, a pair of codes may be formed such that the first code has a relatively low cross-correlation with the second code compared to a cross-correlation of the first or second code with other codes that are, for example, part of the second plurality of codes.

In a further embodiment, a subset of the selected second plurality of codes may be designated as pilot spreading codes. For example, and without limitation, a GNSS signal may allocate a greater proportion of the total signal power to the pilot component compared to other components (e.g., the data component). In such an embodiment, a subset of the second plurality of selected codes that meets a more stringent threshold than the threshold used to select the second plurality of codes may be designated as pilot spreading codes. For example, in the embodiment in which the second plurality of codes is selected as the codes that satisfy even and odd auto-correlation sidelobe thresholds of −31 dB and −28 dB, respectively, and an even and an odd cross-correlation sidelobe thresholds of −27.2 dB and −26.2 dB, respectively, pilot spreading codes may be selected as codes of the selected codes that satisfy the even and odd cross-correlation sidelobe thresholds of −28 dB and −26.5 dB, respectively.

In another embodiment, the codes of the selected codes that have the best correlation properties may be designated pilot spreading codes. For example and without limitation, if 210 code pairs are needed, e.g., 210 pilot codes and 210 data codes, the pilot spreading codes may be selected as the 210 codes that have the best autocorrelation and cross correlation properties.

Figure 5:
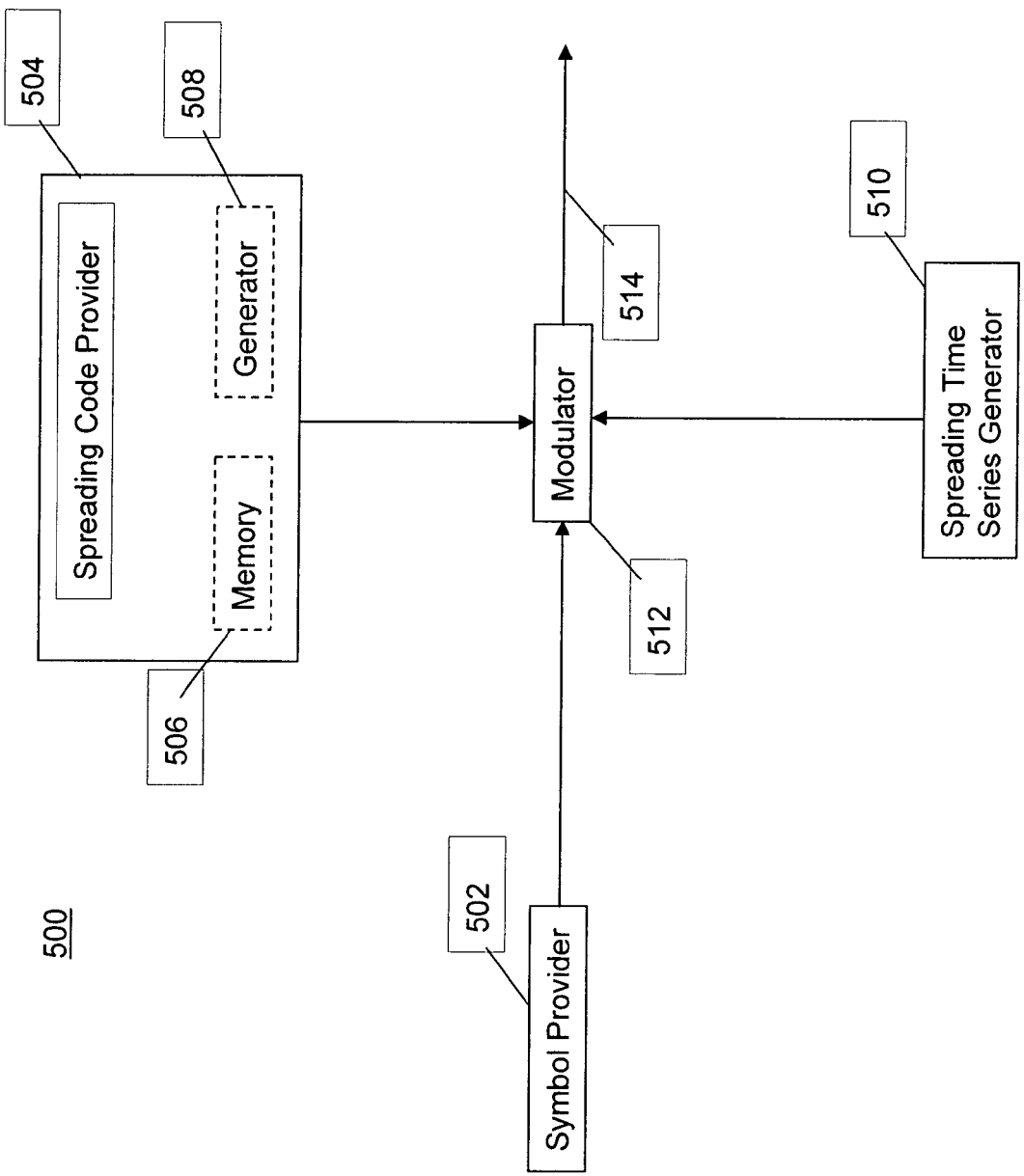
FIG. 5 illustrates a system for generating a signal according to an embodiment of the present invention.

FIG. 5 shows a system for generating a signal 500, according to an embodiment of the present invention. System 500 includes a symbol provider 502, a spreading code provider 504 that optionally includes a memory 506 and a spreading code generator 508, a spreading time series generator 510, and a modulator 512. The operation of system 500 will be described with reference to FIG. 6.

Figure 6:
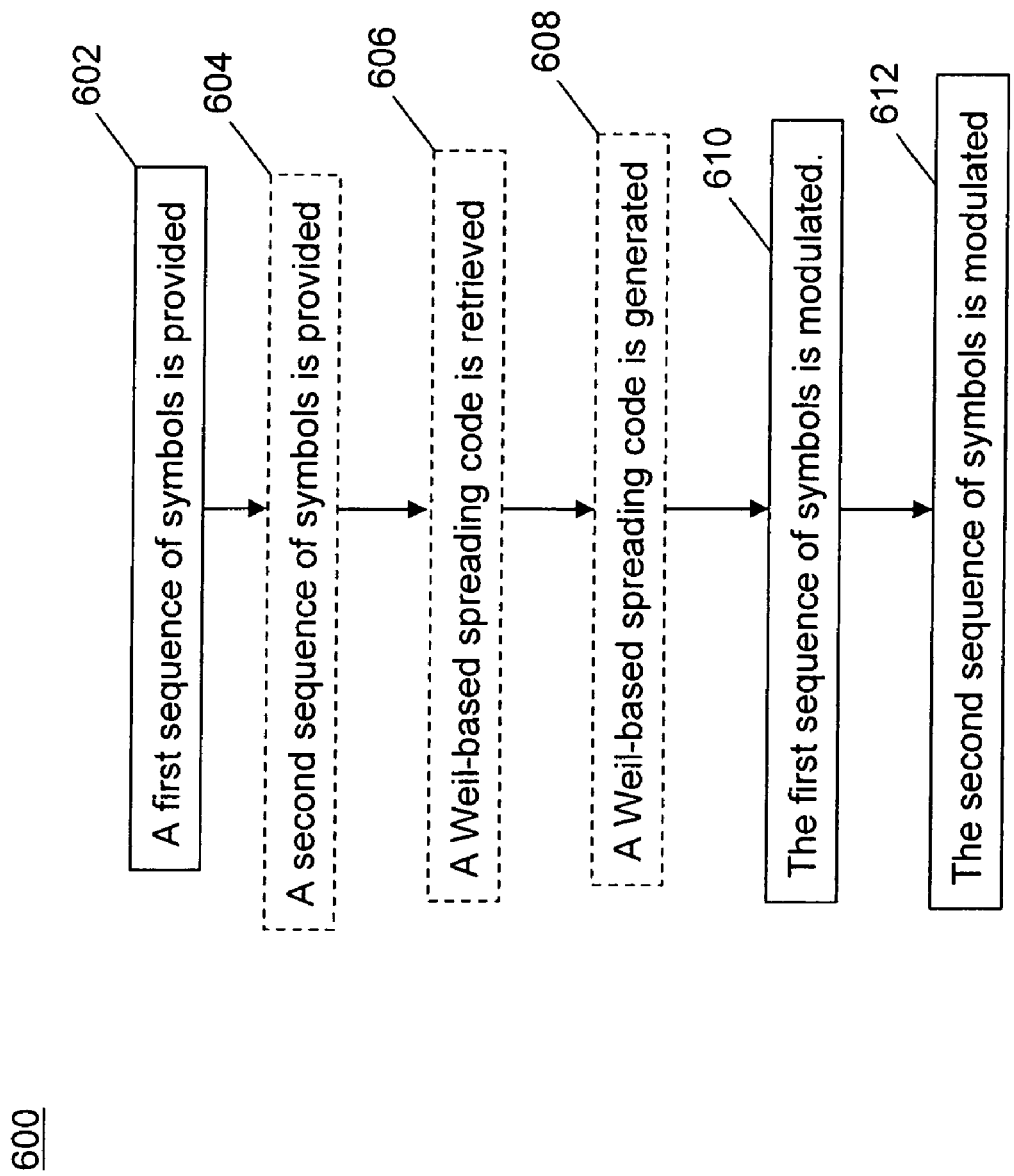
FIG. 6 illustrates a process flowchart for generating a signal according to an embodiment of the present invention.

The operation of an embodiment of the present invention is represented by flowchart 600 illustrated in FIG. 6. Other structural and operational embodiments will be apparent to persons skilled in the relevant art(s) based on the following discussion. The steps shown in FIG. 6 do not necessarily have to occur in the order shown. Flowchart 600 shall now be described.

Flowchart 600 begins with step 602. In step 602, a first sequence of symbols is provided. For example, in FIG. 5, a symbol provider 502 may provide a sequence of symbols to modulator 512. In an embodiment, the sequence of symbols may include data and/or overlay symbols. In another embodiment, the sequence of symbols may be a baseband signal GNSS signal. In a further embodiment, the sequence of symbols may form an L1C signal that has a baseband frequency of 100 Hz.

In optional step 604, a second sequence of symbols is provided. For example, in FIG. 5, symbol provider may provide a second sequence of symbols. In an embodiment, the first sequence of symbols and the second sequence of symbols are multiplexed together using one or more of the known techniques described above.

In the embodiment in which the first sequence of symbols is a data sequence, the second sequence of symbols may be an overlay sequence used to form a pilot sequence. Alternatively, if the first sequence of symbols is an overlay sequence, the second sequence of symbols may be a data sequence.

In optional step 606, a Weil-based spreading code is retrieved. For example, in FIG. 5, spreading code provider 504 may include memory 506 that stores Weil-based spreading codes. The stored Weil-based spreading codes may have originally been generated based on one or more steps of flowchart 300 shown in FIG. 3n and described above.

Weil-based spreading codes stored in memory may be stored according to their correlation properties. Thus, in retrieving a Weil-based spreading code, spreading code provider 504 may choose to retrieve a Weil-based spreading code that has relatively good correlation properties, compared to other stored Weil-based spreading codes. A spreading code that has relatively good correlation properties may be used to modulate an overlay sequence.

In the embodiment in which more than one sequence is provided, spreading code provider 504 may retrieve a different spreading code for each of the sequences provided.

In optional step 608, a Weil based spreading code is generated. For example, in FIG. 5, spreading code provider 504 may include spreading code generator 508 that generates Weil based spreading codes. In an embodiment, generator 508 may generate Weil-based spreading codes based on one or more steps of flowchart 300 shown in FIG. 3, and described above.

As described above, both steps 604 and 606 are optional. In an embodiment, step 604 is completed and step 606 is not so that a Weil-based spreading code is retrieved without generating it. In such an embodiment, the Weil-based spreading code may have been generated at another location, e.g., a server, and then loaded onto a memory, e.g., memory 506.

In an alternate embodiment, step 606 is executed and step 604 is not executed. For example, each time a Weil-based spreading code is needed, a spreading code generator, e.g., spreading code generator 508, may generate a Weil-based spreading code.

In yet another embodiment, both step 604 and step 606 are executed. For example, and without limitation, a Weil-based spreading code may be generated and stored in a memory, e.g., memory 506. Thereafter, the Weil-based spreading code may be retrieved from the memory when needed.

In step 610, the first sequence of symbols is modulated. In an embodiment the first sequence of symbols is modulated with a spreading code and a sequence of spreading symbols. For example, in FIG. 5, modulator 512 may modulate the provided sequence of symbols with a spreading code provided by spreading code provider 504 and a spreading time series provided by spreading time series generator 510. The spreading time series may have a chipping rate of 1.023 MHz, as described above. In such an embodiment, the spreading code may include 10230 elements. Moreover, the provided spreading time series may include BPSK, BOC(1,1), BOC(6, 1), and/or other types of spreading symbols, as would be known to those skilled in the relevant art(s). As described above, the provided spreading code may be optimized for a particular spreading time series.

In optional step 612, the second sequence of symbols is modulated. In an embodiment, the second sequence of spreading symbols is modulated with a second spreading code and a second spreading time series.

In the embodiment in which the first sequence of symbols is a data sequence and the second sequence is an overlay sequence, the data sequence and the overlay sequence may be modulated with different spreading codes. For example, the data sequence may be modulated with a spreading code that is allocated as a data spreading code and the overlay sequence may be modulated with a spreading code that is allocated as a pilot spreading code. As described above, the pilot spreading code and the data spreading code may have a relatively low cross-correlation.

Furthermore, the modulated data sequence may be used to form a data component of a GNSS signal and the overlay sequence may be used to form a pilot component. In a further embodiment, the greater portion of the total signal power may be allocated to the pilot component compared to the data component. Thus, the pilot spreading code may have relatively good, compared to the data spreading code, correlation properties.

Modulator 512 then outputs an output signal 514 that includes a modulated baseband signal. Output signal 514 may then be modulated to a carrier frequency, e.g., 1575.42 MHz, and transmitted to an antenna. The antenna may generate an appropriate electromagnetic signal that is then transmitted to one or more receivers.

Figure 7:
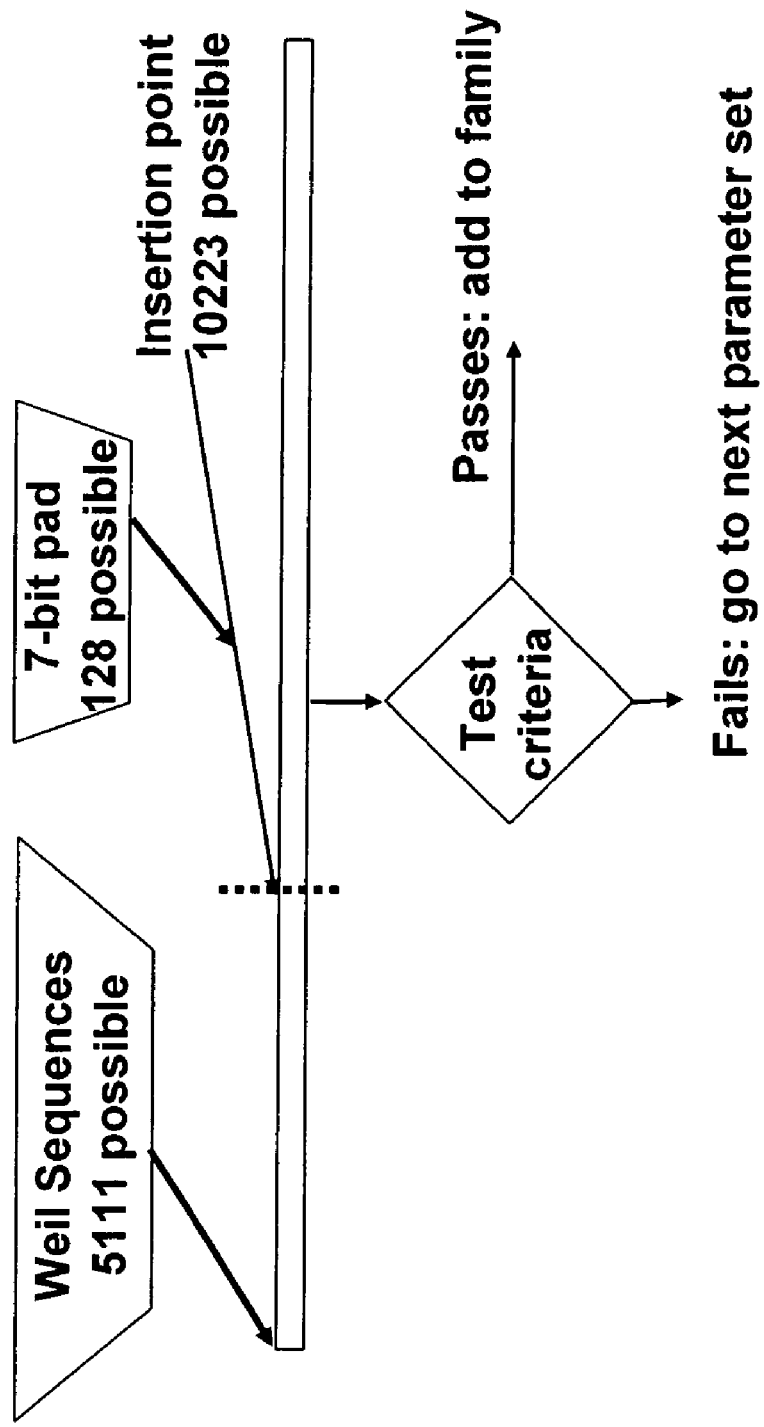
FIG. 7 illustrates a diagram for deriving spreading codes from Weil sequences, according to an embodiment of the present invention.

FIG. 7 shows a diagram 700 illustrating a derivation of spreading codes from Weil sequences, according to an embodiment of the present invention. Diagram 700 is provided as an example and is not meant to limit the invention.

As shown in diagram 700, a derivation of Weil-based spreading codes starts with the generation of a family of Weil sequences. For example, such a derivation may begin with the generation a family of Weil sequences in which each of the sequences has a length of 10223. As described above, such a family includes 5111 sequences. Next, each of the sequences is adapted into a spreading code of desired length. For example, each of the 5111 sequences of the generated family may have a 7-bit pad code inserted. As described above, there are 128 different possible 7 bit pads. For a given pad code the resulting spreading codes may be indexed by k, the family index, and s, the insertion point. The spreading codes are then tested based on their properties. For example, correlations associated with each of the spreading codes may be compared with corresponding thresholds to determine which codes meet the performance requirements for a given application. In alternate embodiments, thresholds may also be determined based on the number of codes needed. For example, if a comparison with a first threshold does not yield a sufficient number of codes, the threshold may be adjusted so that the desired number of codes is obtained. Thus, testing all of the spreading codes may be an iterative process in which the threshold is adjusted so that at least a minimum number of codes are obtained and performance requirements are met. Exemplary thresholds are described above. After testing is complete, a desired number of spreading codes is obtained and can be used in various applications, e.g., GNSS.

CONCLUSION

While various embodiments of the present invention have been described above, it should be understood that they have been presented by way of example only, and not limitation. It will be apparent to persons skilled in the relevant art that various changes in form and detail can be made therein without departing from the spirit and scope of the invention. Thus, the breadth and scope of the present invention should not be limited by any of the above-described exemplary embodiments, but should be defined only in accordance with the following claims and their equivalents.

What is claimed is:

1. A method, comprising:
   generating a set of Weil sequences;
   adapting a plurality of sequences of the set of Weil sequences to form a first plurality of codes, wherein each code of the first plurality of codes has a predetermined length; and
   selecting a second plurality of codes from the first plurality of codes, wherein a code of the first plurality of codes is selected based at least on a correlation associated with the code.

2. The method of claim 1, wherein a length of each sequence of the set of Weil sequences is 10223 or 10243.

3. The method of claim 1, wherein the adapting step comprises:
   inserting a pad code into a sequence of the plurality of sequences at a defined location.

4. The method of claim 3, wherein the pad code is configured such that the sequence of the plurality of sequences has zero balance.

5. The method of claim 1, wherein the selecting step comprises:
   selecting the code from the first plurality of codes if an autocorrelation of the code is below a threshold.

6. The method of claim 5, wherein the autocorrelation is an even autocorrelation or an odd autocorrelation.

7. The method of claim 1, wherein the selecting step comprises:
   selecting the code from the first plurality of codes if a cross-correlation of the code with other codes of the first plurality of codes is below a threshold.

8. The method of claim 7, wherein the cross-correlation is an even cross-correlation or an odd cross-correlation.

9. The method of claim 1, wherein the predetermined length is a length of a global navigation satellite system (GNSS) spreading code.

10. The method of claim 1, further comprising:
    forming a group of codes from the second plurality of codes, wherein each code of the group of codes has a relatively low cross-correlation with another code of the group.

11. The method of claim 1, further comprising:
    designating a plurality of codes of the second plurality of codes as pilot spreading codes or data spreading codes.

12. The method of claim 1, wherein the generating step comprises:
    multiplying a first Legendre sequence with a second Legendre sequence, wherein the second Legendre sequence is a shifted version of first Legendre sequence.

13. The method of claim 1, wherein at least one of the second plurality of codes is optimized for a BOC(1,1) spreading symbol.

14. The method of claim 1, wherein at least one of the second plurality of codes is optimized for a TMBOC spreading time series.

15. A method of generating a signal, comprising:
    providing a sequence of symbols; and
    modulating a sequence of symbols with a Weil-based spreading code, wherein the Weil-based spreading code includes at least a portion of a Weil sequence.

16. The method of claim 15, further comprising:
    modulating the sequence of symbols with a sequence of spreading symbols.

17. The method of claim 16, wherein the sequence of spreading symbols comprises a BOC(1,1) spreading symbol.

18. The method of claim 17, wherein the sequence of spreading symbols further comprises a BOC(6,1) spreading symbol.

19. The method of claim 15, further comprising:
    modulating a second sequence of symbols with a second Weil-based spreading code,
    wherein the second Weil-based spreading code includes at least a portion of a second Weil code,
    wherein the first sequence of symbols is a data sequence and the second sequence of symbols is an overlay sequence,
    wherein the first sequence is used to form a data component of the signal and the second sequence is used to form a pilot component of the signal, and
    wherein a greater portion of a total signal power is allocated to the pilot component compared to the data component.

20. The method of claim 15, further comprising:
    retrieving the Weil-based spreading code from a memory.

21. The method of claim 15, further comprising:
    generating the Weil-based spreading code.

22. The method of claim 21, wherein the generating step comprises:
    multiplying a first Legendre sequence with a second Legendre sequence, wherein the second Legendre sequence is a shifted version of first Legendre sequence.

23. A system for generating a signal, comprising:
    a sequence provider configured to provide a sequence of symbols; and
    a modulator coupled to the sequence provider configured to modulate the sequence of symbols with a spreading code, wherein the spreading code is a Weil-based spreading code, wherein the Weil-based spreading code includes at least a portion of a Weil sequence.

24. The system of claim 23, further comprising:
    a memory, wherein the memory is configured to store the spreading code, wherein the memory is coupled to the modulator.

25. The system of claim 23, further comprising:
    a spreading code generator that generates the spreading code, wherein the spreading code generator is coupled to the modulator.

* * * * *

UNITED STATES PATENT AND TRADEMARK OFFICE
CERTIFICATE OF CORRECTION

| | |
|---|---|
| PATENT NO. | : 7,511,637 B2 |
| APPLICATION NO. | : 12/000991 |
| DATED | : March 31, 2009 |
| INVENTOR(S) | : Joseph J. Rushanan |

It is certified that error appears in the above-identified patent and that said Letters Patent is hereby corrected as shown below:

In column 13, Line 38, remove "3n" and replace with --3--.

Signed and Sealed this

Second Day of June, 2009

JOHN DOLL
*Acting Director of the United States Patent and Trademark Office*